United States Patent [19]
Numbers

[11] 3,967,401
[45] July 6, 1976

[54] VIEWER WITH MOVABLY MOUNTED SLIDE HOLDER

[76] Inventor: Jody L. Numbers, 2212 S. Priest, Tempe, Ariz. 85282

[22] Filed: May 5, 1975

[21] Appl. No.: 574,682

[52] U.S. Cl. ............................................. 40/63 A
[51] Int. Cl.² ....................................... G09F 11/30
[58] Field of Search ............... 40/106.1, 63 A, 64 A, 40/70 A

[56] References Cited
UNITED STATES PATENTS

| | | |
|---|---|---|
| 2,520,432 | 8/1950 | Robertson .......................... 40/106.1 |
| 2,805,500 | 9/1957 | Dixler ................................ 40/63 A |
| 3,018,575 | 1/1962 | Barre et al. ........................ 40/63 A |
| 3,707,052 | 12/1972 | Clark ................................ 40/63 A |

*Primary Examiner*—Louis G. Mancene
*Assistant Examiner*—Wenceslao J. Contreras
*Attorney, Agent, or Firm*—Warren F. B. Lindsley

[57] ABSTRACT

A compact slim line viewer for slides employing a slide holder which is pivoted outwardly of the periphery of the viewer by the slide to viewing position and retractable into the periphery of the viewer when not in use.

16 Claims, 7 Drawing Figures

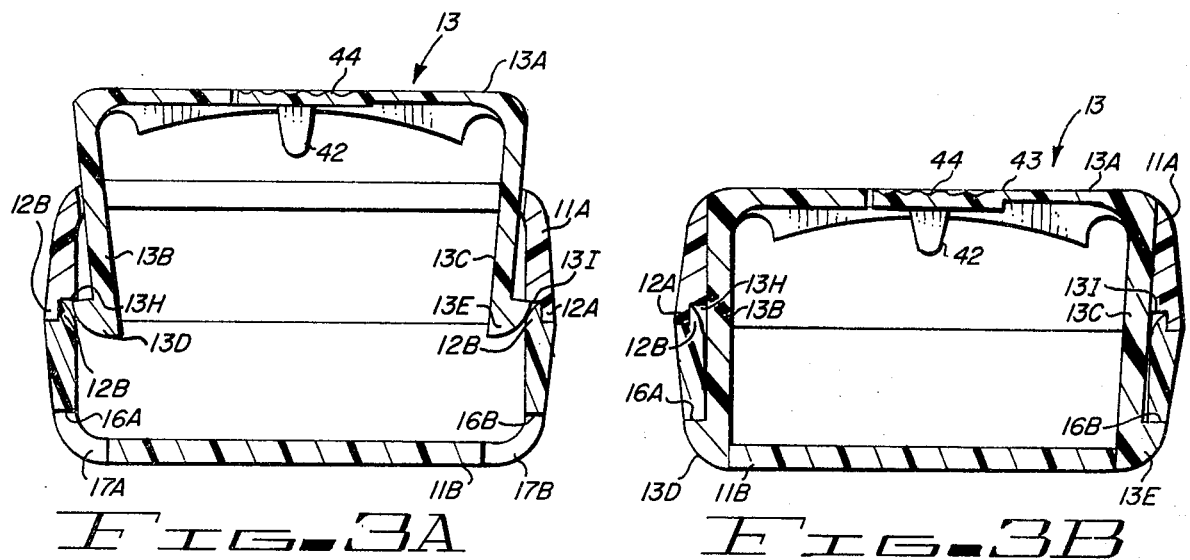
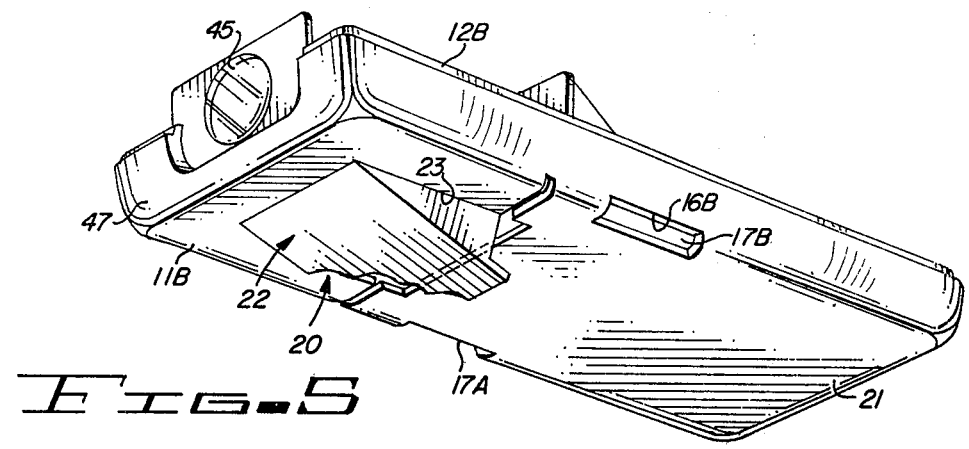
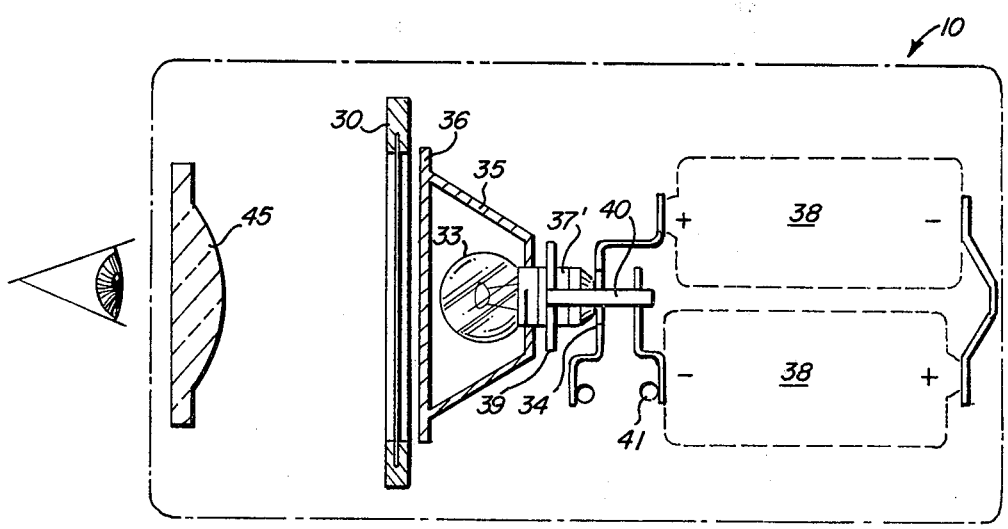

VIEWER WITH MOVABLY MOUNTED SLIDE HOLDER

BACKGROUND OF THE INVENTION

Heretofore viewers for 16 and 35 mm slides were bulky and when reduced in size and cost lacked quality in design and clarity of the illuminated image on the slide.

PRIOR ART

The prior art viewers merely employed a viewing aperture with the light and its energizing and control circuits for illumination purposes mounted directly behind the viewing slide.

SUMMARY OF THE INVENTION

In accordance with the invention claimed, an improved slim line slide viewer is provided which embodies a slide holder activated by the insertion of the slide in the viewer to cause the holder to swing outwardly of the outer periphery of its housing to position the image on the slide in the optical axis of the viewer, the slide holder being moveable back into the peripheral outline of the viewer when not supporting a slide.

It is, therefore, one object of this invention to provide an improved slim line slide viewer.

Another object of this invention is to provide an improved viewer employing a slide holder which pivotally moves outwardly of the periphery of its housing when a slide is inserted into the housing, the holder positioning the picture on the slide in the optical axis of the viewer.

A further object of this invention is to provide an improved viewer in which a magnifying lens is positioned adjacent the eye of the user for direct viewing of the illuminated image on the slide.

A still further object of this invention is to provide an improved viewer for slide mounted film wherein the switch for energizing the electric bulb in the viewer is part of the clamp for holding together the two halves of the viewer housing.

A still further object of this invention is to provide a viewer employing a switching means forming a part of the periphery of the housing of the viewer which springs back from its switch engaging position through the inherent resiliency of the material from which it is formed.

Other objects and advantages of the invention will become apparent from the following description when taken in connection with the accompanying drawings.

BRIEF DESCRIPTION OF THE DRAWINGS

The present invention may be more readily described by reference to the accompanying drawings, in which:

FIG. 3A is a cross sectional view of FIG. 1 taken along the line 3A—3A when the two portions of the housing are together with the clamp inserted in the housing at an intermediate known clamping position.

FIG. 3B is a cross sectional view similar to FIG. 3A with the clamp in engaging position for holding the two portions of the housing firmly together;

FIG. 5 is a partial perspective view of the lower portion of the viewer shown in FIG. 1 with the slide holder in its extended position; and FIG. 6 is a diagrammatic view of the optical and electrical features of the viewer shown in FIG. 1.

DESCRIPTION OF THE PREFERRED EMBODIMENT

Referring more particularly to the drawings by characters of reference, FIGS. 1–6 disclose a slide viewer 10 adapted to be handheld and having a substantially rectangular relatively flat or shallow housing configuration small enough to fit comfortably into the pocket of a garment.

Figure 1:
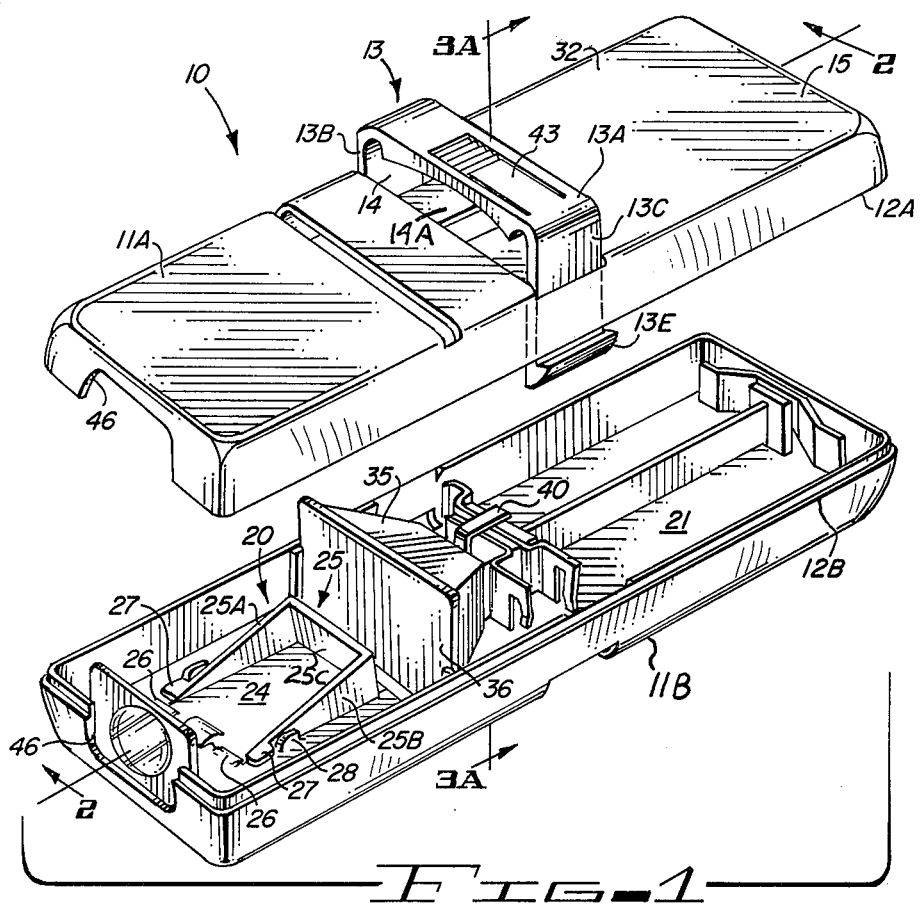
FIG. 1 is an exploded perspective view of a slide viewer embodying the invention.
Figure 4:
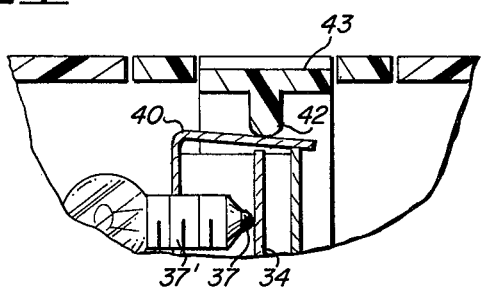
FIG. 4 is an enlarged partial cross sectional view of the circled portion 4 of FIG. 2.

The viewer comprises two generally rectangular portions 11A and 11B which engage along overlapping edges 12A and 12B to form a snug fit, shown more clearly in FIGS. 3A and 3B. These portions are held together in over-lapping engagement by a U-shaped clamp 13 extending through an opening 14 formed laterally across the top surface 15 of portion 11A as shown in FIG. 1. Clamp 13 comprises a bight portion 13A interconnecting two leg portions 13B and 13C. Each of these leg portions terminate in pointed configurations 13D and 13E which are provided with a flange or catch which in the non-clamping position, shown in FIG. 3A, engage notches 13H and 13I formed by the interlocking of edges 12A and 12B when portions 11A and 11B of the viewer are engaged.

When the clamp is positioned in its holding position, the catches engage the sides or edges 16A and 16B of openings 17A and 17B in portion 11B, as shown in FIG. 3B.

Clamp 13 may be formed of plastic or any other suitable resilient material which is biased to expand its legs outwardly away from each other when inserted in the viewer housing, thereby clamping the two portions of the viewer tightly together when in the clamping position shown in FIG. 3B. Clamp 13 may be placed over the top portion 11A to engage openings 17A and 17B from the outside of the inner portion 11B rather than through opening 14 where it seats on ledge 14A.

In accordance with the invention claimd, a slide holder 20 is formed out of a part of member 21 forming the peripheral surface of portion 11B of the viewer. The holder comprises a hinged member 22 cut out of the peripheral surface of member 21 of portion 11B of the viewer forming an opening 23 in this surface and having laterally mounted on its inner surfaces 24 a U-shaped flange 25 which rigidifies member 22 and forms bearing members for guiding the holder as it moves in and out of opening 23.

As noted from FIG. 1 of the drawings, a pair of spaced tabs 26 are arranged on the inside surface of member 21 and are arranged to extend over the narrow edges of opening 23 and over the inside surface 24 of member 22.

The legs 25A and 25B of flange 25 are also provided with tabs 27 which extend outwardly therefrom to overlap the edges of opening 23. These tabs control the amount of movement of the holder outwardly of the surface of member 21 of the lower portion 11B of the viewer. A further pair of tabs 28 mounted along the edge of opening 23 longitudinally of the housing extend laterally of the inside surface of member 21, as shown in FIG. 1, for aiding in guiding the movement of the holder in and out of opening 23.

Figure 2:
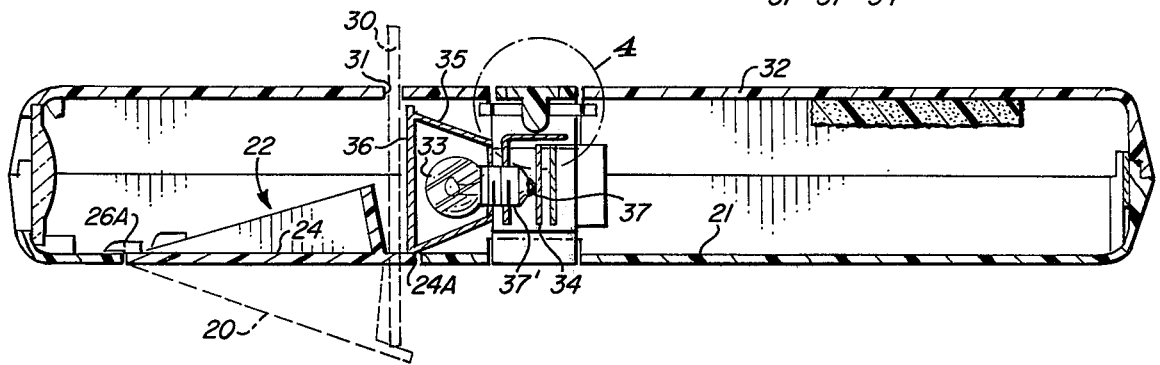
FIG. 2 is a cross sectional view of FIG. 1 taken along the line 2—2.

As noted from FIGS. 1 and 2 of the drawings, the bight 25C of the U-shaped flange 25 is arranged a short distance away from the edge 24A of surface 24 of holder 20 so that when a slide 30 is pushed through a rectangular opening 31 in member 32 of portion 11A of the viewer housing it will be guided by the sides of opening 31 and the bight 25C of flange 25 against the edge of surface 24 of member 22 and upon a predetermined amount of pressure will pivot the holder 20 about its pivotal hinge connection formed by tabs 26 and 27 to its viewing position shown in FIG. 2.

Thus, it is noted that the slide holder may be moved from its closed position shown in FIG. 1 into its open position shown in FIGS. 2 and 5. The slide when inserted in opening 31 in the upper portion 11A of the viewer acts as a tripping means capable of being depressed by the operator to trip the holder open and accurately position the slide and its image in optical viewing position.

The viewer further comprises an electrical illuminating system employing an electric bulb 33 of a suitable voltage and current rating which is mounted in a holder 34 secured to the inside surface of member 21 of portion 11B of the viewer. The bulb is arranged to extend into a cone shaped reflector 35 with the wide opening of the cone shaped reflector being covered by a transparent member 36 either forming a part of the reflector or insertable in front thereof. The positive terminal 37 of the bulb is electrically connected with the positive terminals of two series connected batteries 38 in a well known manner with the battery's negative terminals connected in series with the threaded casing 37' of the bulb thereby completing an electrical circuit through the bulb to illuminate it and any slide placed in the viewer in front thereof.

In order to make and break the electrical circuit through bulb 33, a leaf spring contact 40 having a contact arm 39 capable of interconnecting the negative terminal 41 of the bulb energizing circuit to the bulb must be pushed against its normal bias against the outer casing 37' of bulb 33. This is accomplished by a prong 42 mounted on the inside surface of a hingedly mounted tab 43 formed in the bight 13A of clamp 13, as shown in FIGS. 3A and 3B. This tab which may be formed out of a portion of clamp 13, if so desired, is shown as comprising a cut out portion of the clamp which is partially severed from the material of the bight portion of the clamp along three sides only of the tab. Since the tab is normally biased into surface aligning position with the rest of the surface of the bight portion of the clamp, its prong 42 mounted on the inner surface of the bight is normally in non-engaging arrangement, i.e. out of contact with leaf spring 40 of the electrical system. When prong 42 is moved against the leaf spring and then moved with the leaf spring against casing 37' of the bulb, electrical contact between the bulb and the batteries is made in the usual manner. Release of operator finger pressure on tab 43 will release the tab causing it to move back under its normal biasing conditions to surface alignment with the bight 13A of clamp 13 to break the electrical contact. If desired the outer surface of tab 43 may be provided with a knurled surface 44 to aid in moving the tab in circuit making operations.

In accordance with a further teaching of this invention, a lens 45 which may be magnifying in nature is mounted in a viewing aperture 46 formed by the end 47 of the viewer when portions 11A and 11B are clamped together. This lens may be slide mounted and as shown comprises a means for viewing the image on the slide with the eye of the view positioned immediately against the lens in optical alignment with the image on the slide.

Thus, applicant has provided a new slim line viewer which utilizes a trap door arrangement for viewing the image of a slide without the need for containing within the periphery of the viewer the whole slide and which permits the placement of the eye against a magnifying lens for more clarity of viewing than heretofore possible with prior art structures.

Although but one embodiment of the present invention has been illustrated and described, it will be apparent to those skilled in the art that various changes and modifications may be made therein without departing from the spirit of the invention or from the scope of the appended claims.

What is claimed is:

1. A viewer for slide mounted negatives comprising:
   a housing having cooperating top and bottom portions,
   a slide receiving slot formed to extend through said top portion,
   a slide holder formed in said bottom portion of said housing comprising a cutaway portion of said bottom portion hingedly mounted at one end thereof to move from a position in surface alignment with the outer periphery of said bottom portion to a position angular with said bottom portion,
   said cutaway portion being aligned with said slot so that a slide inserted in said slot engages the other end of said cutaway portion and upon pressure applied thereto pivotally moves said holder to said angular position, thereby aligning the slide in a given optical viewing position in said housing.

2. The viewer set forth in claim 1 wherein:
   the cross section area of said housing is less than the cross sectional area of a slide inserted therein.

3. The viewer set forth in claim 1 wherein:
   said cutaway portion of said slide holder is reinforced along its surface inside of the housing by a flange extending laterally thereof one part of which guides the slide inserted into the housing into surface contact with said cutaway portion.

4. The viewer set forth in claim 3 in further combination with:
   a light reflecting means mounted in said housing juxtapositioned to said other end of said cutaway portion which in combination with said flange guides the slide into surface contact with said cutaway portion.

5. The viewer set forth in claim 1 in further combination with:
   clamp means comprising a U-shaped member the legs of which extend laterally across the longitudinal axis of said top portion into and engaging said bottom portion to hold said top and bottom portions together.

6. The viewer set forth in claim 5 wherein:
   said bottom portion is provided with a pair of apertures, and
   the ends of said legs of said clamp means engage the edges of said apertures formed in said bottom portion to firmly fasten said top and bottom portions together.

7. The viewer set forth in claim 5 in further combination with:

switch means mounted in one of said top and bottom portions of said housing, and means forming a part of said clamp means for selectively closing and opening said switch means.

8. The viewer set forth in claim 7 wherein:

said switch means comprises a cutaway portion of said clamp means hingedly mounted on said clamp means and pivotally mounted to close and open said switch means.

9. The viewer set forth in claim 8 wherein:

said cutaway portion of said clamp means has a prong extending laterally thereof into said housing for engaging when biased said switch means.

10. The viewer set forth in claim 1 wherein:

said housing defines a viewing aperture at one and thereof formed partially in each of said bottom and top portions for viewing the slide when inserted into said housing.

11. The viewer set forth in claim 10 in further combination with:

a lens mounted in said housing adjacent to and covering said viewing aperture.

12. The viewer set forth in claim 11 wherein:

said lens comprises a magnifying lens.

13. A viewer for slide mounted negatives comprising in combination:

a housing having cooperating top and bottom portions, a viewing aperture formed by said top and bottom portions in one end of said housing, a slide receiving slot formed to extend through said top portion, a slide holder formed in said bottom portion of said housing comprising a cutaway portion of said bottom portion hingedly mounted at one end thereof to move from a position in surface alignment with the outer periphery of said bottom portion to a position angular with said bottom portion, said cutaway portion being aligned with said slot so that a slide inserted in said slot engages the other end of said cutaway portion and upon pressure applied thereto pivotally moves said holder to said angular position, thereby aligning the slide in a given optical viewing position in said housing, clamp means comprising a U-shaped member the legs of which extend through a second slot formed laterally across the longitudinal axis of said top portion into and engaging said bottom portion to hold said top and bottom portions together, said switching means comprising a cutaway portion of said clamp means hingedly mounted on said clamp means to close and open said switch means, battery means mounted in said housing on the opposite end thereof from said viewing aperture, bulb means connectable with said battery means mounted in said housing on the other side of said slide receiving slot from said viewing aperture, and circuit means for connecting said battery means with said bulb means through said switching means.

14. The viewer set forth in claim 13 in further combination with:

a lens mounted in said housing adjacent to and covering said viewing aperture.

15. A viewer for slide mounted negatives comprising:

a housing having cooperating top and bottom portions, a slide receiving slot formed to extend through one of said portions, a slide locating device for forming an appendage formed in the other portion of said housing and moveable from a position within said housing to a position partially without the outer periphery of said housing, said appendage being aligned with said slot so that a slide inserted in said slot engages the locating device and upon pressure applied thereto moves said device to cause said appendage to move to its position partially without the periphery of said housing, thereby aligning the slide in a given optical viewing position in said housing.

16. The viewer set forth in claim 15 wherein:

said slot is formed to extend through said top portion of said housing, and said slide locating device is formed in said bottom portion of said housing.

* * * * *